United States Patent
Movert et al.

(10) Patent No.: US 10,800,430 B2
(45) Date of Patent: Oct. 13, 2020

(54) DRIVING INTERVENTION IN VEHICLES

(71) Applicant: Volvo Car Corporation, Gothenburg (SE)

(72) Inventors: Anders Movert, Gothenburg (SE); Nasser Mohammadiha, Gothenburg (SE); Peter Hardå, Torslanda (SE)

(73) Assignee: Volvo Car Corporation, Göteborg (SE)

( * ) Notice: Subject to any disclaimer, the term of this patent is extended or adjusted under 35 U.S.C. 154(b) by 54 days.

(21) Appl. No.: 16/212,852

(22) Filed: Dec. 7, 2018

(65) Prior Publication Data

US 2019/0176846 A1    Jun. 13, 2019

(30) Foreign Application Priority Data

Dec. 11, 2017  (EP) .................................. 17206454

(51) Int. Cl.
   *B60W 50/14*   (2020.01)
   *B60W 50/00*   (2006.01)
   (Continued)

(52) U.S. Cl.
   CPC .......... *B60W 50/14* (2013.01); *B60W 30/095* (2013.01); *B60W 40/09* (2013.01);
   (Continued)

(58) Field of Classification Search
   CPC .... B60W 50/14; B60W 40/09; B60W 30/095; B60W 50/0097; B60W 2554/00;
   (Continued)

(56) References Cited

U.S. PATENT DOCUMENTS 7,839,292 B2   11/2010  Wang et al.
2007/0136040 A1  6/2007  Tate
(Continued)

FOREIGN PATENT DOCUMENTS

DE   4322717 A1   1/1995
FR   2684347 A1   6/1993
(Continued)

OTHER PUBLICATIONS

Jun. 15, 2018 European Search Report issue on International Application No. EP17206454.

*Primary Examiner* — Rodney A Butler
(74) *Attorney, Agent, or Firm* — Clements Bernard Walker; Christopher L. Bernard

(57) ABSTRACT

A method for providing an alert signal to a control unit of a vehicle for controlling driver intervention. The method comprises determining a set of present driving behavior data indicative of a present driving behavior in a present driving situation and retrieving a driving model indicative of expected driving behavior for the present driving situation. Further, a plurality of expected near future paths for the vehicle are predicted and an actual path is additionally determined. The set of present driving behavior data is mapped with the driving model. When a predetermined degree of deviation in the set of present driving behavior data compared to the driving model is found and the actual path deviates from the predicted expected paths, the alert signal is provided.

13 Claims, 7 Drawing Sheets

(51) Int. Cl.
*B60W 40/09* (2012.01)
*G06F 16/24* (2019.01)
*G06N 3/08* (2006.01)
*G08G 1/16* (2006.01)
*B60W 30/095* (2012.01)
*G06F 16/2455* (2019.01)

(52) U.S. Cl.
CPC ..... *B60W 50/0097* (2013.01); *G06F 16/2455* (2019.01); *G06N 3/088* (2013.01); *G08G 1/167* (2013.01); *B60W 2050/0089* (2013.01); *B60W 2400/00* (2013.01); *B60W 2520/10* (2013.01); *B60W 2520/14* (2013.01); *B60W 2540/00* (2013.01); *B60W 2540/30* (2013.01); *B60W 2554/00* (2020.02); *B60W 2556/50* (2020.02); *B60W 2556/55* (2020.02); *B60W 2900/00* (2013.01)

(58) Field of Classification Search
CPC ......... B60W 2556/50; B60W 2556/55; B60W 2540/00; B60W 2050/0089; B60W 2400/00; B60W 2900/00; B60W 2520/10; B60W 2520/14; B60W 2540/30; B60W 2050/007; B60W 2050/143; G06F 16/2455; G06N 3/088; G08G 1/167
See application file for complete search history.

(56) References Cited

U.S. PATENT DOCUMENTS

| | | |
|---|---|---|
| 2008/0084283 A1 | 4/2008 | Kalik |
| 2012/0326410 A1 | 12/2012 | West et al. |
| 2014/0162219 A1 | 6/2014 | Stankoulov |
| 2016/0288798 A1 | 10/2016 | Michalke et al. |
| 2018/0003516 A1* | 1/2018 | Khasis ............... G06Q 10/1097 |

FOREIGN PATENT DOCUMENTS

| | | |
|---|---|---|
| FR | 2919230 A1 | 1/2009 |
| WO | 9829292 | 7/1998 |
| WO | 0226548 A1 | 4/2002 |

* cited by examiner

DRIVING INTERVENTION IN VEHICLES

CROSS-REFERENCE TO RELATED APPLICATION

The present patent application/patent claims the benefit of priority of co-pending European Patent Application No. 17206454.5, filed on Dec. 11, 2017, and entitled "DRIVING INTERVENTION IN VEHICLES," the contents of which are incorporated in full by reference herein.

FIELD OF THE INVENTION

The present invention relates to a method and a system for providing an alert to a vehicle control unit.

BACKGROUND OF THE INVENTION

Advanced driver assist systems (ADAS) in vehicles range from cruise control and adaptive lighting to more advanced systems such as automatic braking, automatic steering to keep the vehicle in the right lane, and system for alerting the driver of the presence of other cars, etc. Generally, ADAS retrieve input data from multiple sources such as image processing from cameras, ultrasonic sensors, radar, or LiDAR. More recently, vehicle-to-vehicle connectivity, and cloud based connectivity is arising as a promising addition to present ADAS.

One aspect of ADAS is to provide warnings to the driver if the driving behavior is in some way deviating from what is considered safe driving. For example, a warning may be provided to a driver if he/she is driving to close to the vehicle in front. Further, the ADAS may even provide intervention, for example automatic braking in case the vehicle is approaching an obstacle too fast and it is predicted that a collision is about to occur.

However, it is not uncommon that drivers ignore the warnings. It could for example be that the timing of the warning signal is not accurate or simply that the warning is perceived as incorrect. This may even lead to that the driver turns off the warnings or intervention functions provided by the ADAS.

Accordingly, there is room for improvement with regards to providing efficient driver interventions in vehicles.

SUMMARY

In view of above, it is an object of the present invention to provide a method for providing an alert signal to a control unit in a vehicle such that intervention of vehicle actions may be efficiently performed.

According to a first aspect of the invention, there is provided a method for providing an alert signal to a control unit of a vehicle for controlling driver intervention, the method comprising: determining a set of present driving behavior data indicative of a present driving behavior in a present driving situation, retrieving a driving model indicative of expected driving behavior for a present driving situation, the model being based on historical driving behavior data collected for a plurality of driving situations, wherein the driver model is further based on stochastically analyzing distributions of the historical driving behavior data, predicting a plurality of expected near future paths for the vehicle in the present driving situation, determining an actual path taken by the vehicle from the present driving situation; mapping the set of present driving behavior data with the driving model, comparing the actual path with the plurality of expected near future paths, wherein when a predetermined degree of deviation in the set of present driving behavior data compared to the driver model is found, and the actual path deviates from the predicted expected paths, providing the alert signal to the control unit.

The present invention is based on the realization that providing an alert for initiating an intervention in a vehicle may have to be adapted such that the driver of the vehicle does not ignore the warning. The inventors therefore realized that by employing a "surprise" based method, i.e. that when a driver behavior deviates from the expected behavior and the actual driven path deviates from an expected path, then an alert signal should be provided to a control unit. The control unit that receives the alert signal may be part of an advanced driver assist system and may take the appropriate intervention action based on the alert signal such that an hazardous driving action by the driver may be intervened.

The expected driver behavior may for example be that it is expected that the driver brakes or turns when the vehicle is approaching an obstacle at a too high speed, or that the vehicle turns when the road turns, or that a vehicle stops at a red light, to mention some examples of expected driving behavior.

The expected near future path should be interpreted as meaning the path for the vehicle during the upcoming seconds for the vehicle. Thus, the predicted expected near future paths include the predicted path during the following e.g. 1, 2, 3, 4, or 5 seconds. A path should be understood as meaning any one of, or a combination of a longitudinal path, lateral path, and/or a height path.

The driver model may be determined by processing the historical driving behavior data using any one of a denoising encoder, a generative adversarial network, or a markov chain method. Accordingly, the stochastically analysis may be performed by various methods. Using any of the mentioned methods provides an efficient way to determine a driver model from the historical data. Further, the mentioned stochastic methods provides for efficient updating of the driver models with new data. The preferred method is to use a generative adversarial network.

The driver model may comprise a set of parameters for a given driving situation. The parameters may relate to steering angle for the vehicle, speed, acceleration, lane position, gear, distance to other objects, etc.

Further, the present driver behavior data may comprise a set of parameters for a given driving situation. The parameters may relate to steering angle for the vehicle, speed, acceleration, lane position, gear, distance to other objects, etc.

The expected near future driving paths may be based on the present set of driver behavior data and the driver model to thereby provide more accurate expected near future driving paths. For example, it may be that for one driver model some expected near future driver paths may be more likely than for another driver model.

According to embodiments of the invention, predicting an expected near future driving path may further comprise: determining vehicle driving data indicative of at least the vehicle velocity and the vehicle yaw rate, determining object data indicative of objects located in the vicinity of the vehicle and the position and the velocity of the objects with respect to the vehicle; acquiring road data indicative of the roadway on the road where the vehicle is presently driving, and predicting the expected near future driving path based on the road data, the vehicle driving data, and the object data.

Further, predicting the near future driving path may advantageously be based on inputting the object data, the vehicle driving data, and the road data into a deep neural network. The deep neural network may be a multi-layer convolutional neural network comprising recurrent or recursive layers to improve the prediction accuracy of the path prediction. The deep neural network may also improve the consistency of the path prediction.

The object data may be extracted from sensor data from at least one of image data, ultra sonic data, radar data, and lidar data.

Furthermore, sensor data may be used to determine a present driving situation. In other words, sensor data may be collected for identifying objects in the vicinity of the vehicle, the objects' positions and headings with respect to the vehicle and the objects' velocity with respect to the vehicle, to thereby establish the present driving situation.

The road data provides information about the drivable road area of the road. For example, sensor data may be analyzed to detect lane markings on the road, or to detect the road edges. Road edges and lane markings may primarily be detected by processing camera or lidar signals in a pre-processing step, or in a separate processing step using e.g. machine learning or computer vision methods and statistical signal processing, per se known to the skilled person.

The drivable road area may be a part of the road between lane markings or road edges of the road in are it is suitable for the vehicle to drive.

In addition, the road data may further comprises map data. Such map data may be extracted from online maps or from a navigation system in the vehicle. The map data may relate to the road path, locations of crossings, exits/entrances to the highways, number of lanes, etc.

The driver model may advantageously be updated with the present driver behavior data. Thus, the driver model may constantly be updated by including the present driver behavior data to the driver model.

The driver model may be retrieved from a remote server. Thus, a plurality of driver models may be computed on a server (i.e. in the "Cloud") and be based on driver behavior data from a plurality of vehicles. The driving models in the cloud may thus be updated constantly on the server in order to keep improving the models with additional data.

According to a second aspect of the invention, there is provided a system for providing an alert signal for a vehicle, the system comprising: a control unit configured to retrieve a driving model indicative of expected driving behavior for a present driving situation, the model being based on historical driving behavior data collected for a plurality of driving situations, wherein the driver model is further based on stochastically analyzing distributions of the historical driving behavior data; a path predicting module configured to predict a plurality of expected near future driving path for the vehicle based on the driving model, and determine an actual driving path for the vehicle based on subsequent driver behavior data, a sensor unit for determining a set of present driving behavior data indicative of the present driving behavior in the present driving situation; and wherein the control unit is configured to map the set of present driving behavior data with the model, and to compare the actual driving path with the expected near future driving path, wherein, when the actual driving path deviates from the plurality of expected near future driving paths, and when a deviation in the set of present driving behavior data compared to the model is found, the control unit is configured to provide the alert signal.

According to embodiments of the invention, the sensor unit may comprise at least one of an image capturing device, a radar, or a lidar for acquiring sensor data indicative of objects in the vicinity of the vehicle, the system comprising a vehicle sensor unit for collecting vehicle driving data indicative of at least the velocity and the yaw rate of the vehicle, wherein for predicting the expected near future driving path the predicting module is further configured to: determining vehicle driving data indicative of at least the vehicle velocity and the vehicle yaw rate; retrieve the object data; acquire road data indicative of the roadway on the road where the vehicle is presently driving, wherein the expected near future driving path is based on the road data and the object data.

The object data comprises a time series of previous positions of the respective object relative the vehicle, a time series of the previous headings of the objects, and time series of previous velocities of each of the objects relative the vehicle.

The sensor unit may be an out-looking sensing unit configured to capture sensor data indicative of objects present in the vicinity of the object in any direction from the vehicle. In other words, the out-looking sensor unit may advantageously have 360 degree coverage around the vehicle. In some implementations, the out-looking sensor unit may be a forward-looking sensor unit having a field of view covering an area in front of the vehicle.

The object position with respect to the vehicle should be understood to include information such that the distance from the object to the vehicle can be determined and also in which direction (e.g. heading, bearing, or front, rear, left right) from the vehicle the object is located. The position of an object may for example be a coordinate in a coordinate system where the vehicle's coordinates are known.

The object data may further comprise angular rotation rates of the object with respect to the vehicle.

Vehicle driving data comprises at least data indicative of the velocity and the angular velocity (e.g. "yaw rate") of the vehicle. Vehicle driving data may further comprise data indicative of the acceleration, pitch rate, roll rate, etc., of the vehicle. A pitch motion of the vehicle is a rotation of the vehicle body around a transverse axis parallel with a side-to-side axis through the vehicle. A roll motion is a rotation of the vehicle around a longitudinal axis parallel with a front-to-rear axis through the vehicle. The vehicle driving data is used as a further input for predicting the expected near future diving paths.

The control unit may advantageously be configured to provide the alert signal to a driver assist system in the vehicle. The driver assist system may control driving interventions such as automatic braking, steering, etc.

This second aspect of the invention provides similar advantages as discussed above in relation to the first aspect of the invention.

According to a third aspect of the invention, there is provided a vehicle comprising the system according to the second aspect of the invention.

According to a fourth aspect of the invention, there is provided a computer program product comprising a computer readable medium having stored thereon computer program means for controlling a control unit of a vehicle to provide an alert signal, wherein the computer program product comprises: code for determining a set of present driving behavior data indicative of the present driving behavior in a present driving situation, code for retrieving a driving model indicative of expected driving behavior for the present driving situation, the model being based on historical driving behavior data collected for a plurality of driving situations, wherein the model is further based on stochastically analyzing distributions of the historical driving behavior data; code for predicting a plurality of expected near future paths for the vehicle in the present driving situation, code for determining an actual path taken by the vehicle from the present driving situation; code for mapping the set of present driving behavior data with the model, and code for, when a predetermined degree of deviation in the set of present driving behavior data compared to the model is found, and the actual path deviates from the predicted expected paths, controlling the control unit to provide the alert signal.

This fourth aspect of the invention provides similar advantages as discussed above in relation to the previous aspects of the invention.

In summary, the present invention relates to a method for providing an alert signal to a control unit of a vehicle for controlling driver intervention. The method comprises determining a set of present driving behavior data indicative of a present driving behavior in a present driving situation, and retrieving a driving model indicative of expected driving behavior for the present driving situation. Further, a plurality of expected near future paths for the vehicle is predicted, and an actual path is additionally determined. The set of present driving behavior data is mapped with the driving model. When a predetermined degree of deviation in the set of present driving behavior data compared to the driving model is found, and the actual path deviates from the predicted expected paths, the alert signal is provided.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS

Figure 1:
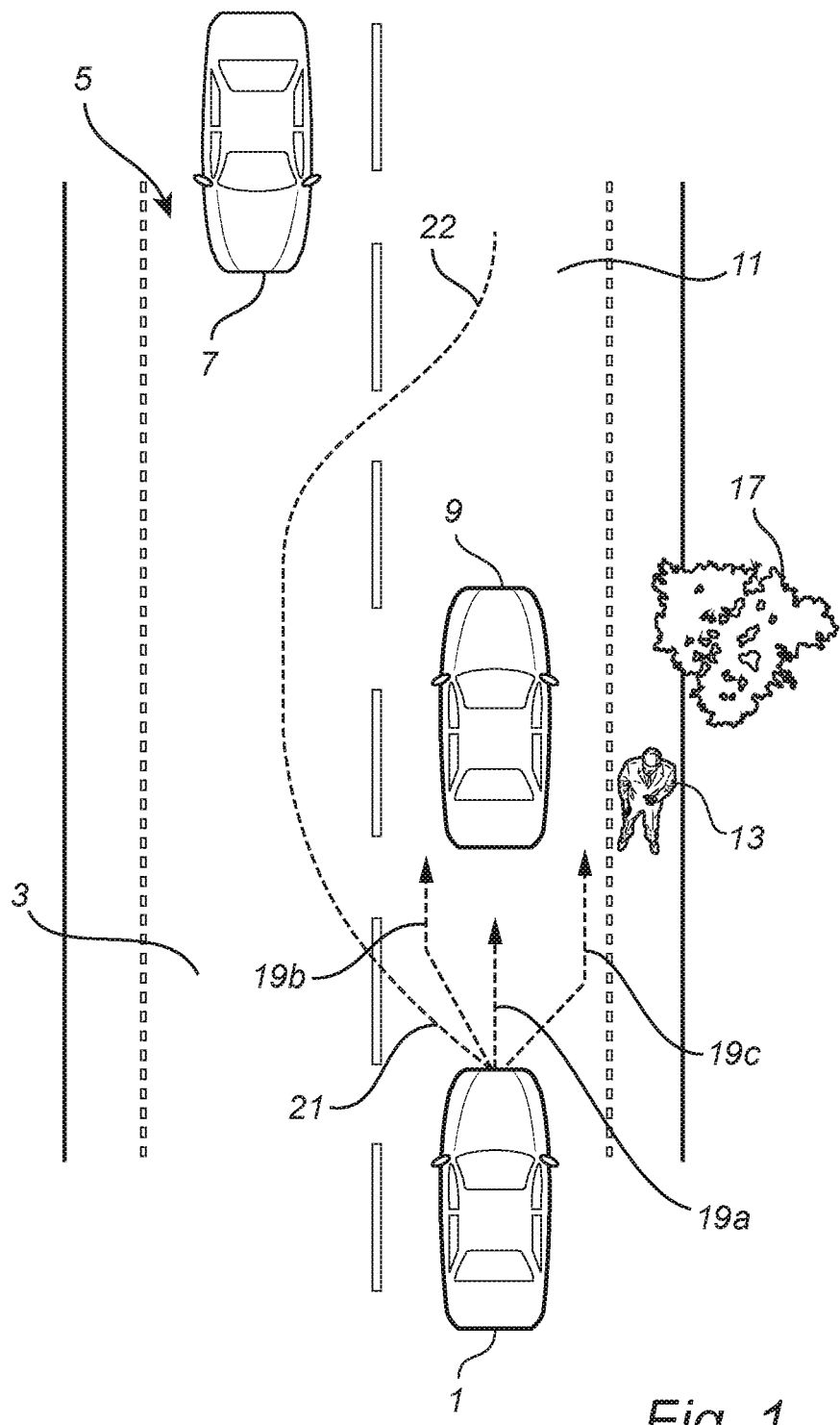
FIG. 1 conceptually illustrates application of embodiments of the invention.

In the present detailed description, various embodiments of the system and method according to the present invention are mainly described with reference to a vehicle in the form of a car. However, the present invention may equally be used with other vehicles such as trucks, buses, etc. Thus, this invention may be embodied in many different forms and should not be construed as limited to the embodiments set forth herein; rather, these embodiments are provided for thoroughness and completeness, and to fully convey the scope of the invention to the skilled person. Like reference characters refer to like elements throughout.

FIG. 1 conceptually illustrates application of the invention. FIG. 1 shows a vehicle 1 driving on a road 3. The vehicle 1 may have installed sensors (not shown) such as a radar, a lidar, an ultra sonic sensor, and/or an image capturing device for obtaining sensor data indicative of the presence of object in the vicinity of the vehicle 1. The object may for example be an oncoming vehicle 7 approaching the vehicle 1 on the opposite lane 5, a vehicle 9 driving in front of the vehicle 1 in the same lane 11, a pedestrian 13 walking on a side walk 15 next to the road 3, or a tree 17 next to the road 3, to mention a few exemplary possible objects.

As the vehicle 1 is driving down the road 3 in this present driving situation, the sensors collect sensor data indicative of the presence of the objects 7, 9, 13, 17. The sensor data may be images from an image capturing device, e.g. a camera, or sensor data from a radar or Lidar or an ultra sonic sensor.

The vehicle comprises a control unit (not shown in FIG. 1) which is configured to retrieve a driving behavior model indicative of an expected driving behavior for this present driving situation. The present driving situation may be determined from analyzing the object data extracted from the sensor data. The object data will be addressed further with reference to FIGS. 4 and 5.

In this exemplary present driving situation for the vehicle 1, the vehicle 1 is driving faster than the vehicle 9. There is further a vehicle 7 driving on the opposite lane and approaching the vehicle 1 relatively fast in an opposite direction compared to vehicle 1 and vehicle 9. The vehicle 1 is approaching the vehicle 9 from behind and one expected driving behavior according to the retrieved driving model is for the vehicle 1 to slow down and one of the expected near future paths is to maintain on the present course 19a, i.e. slow down and stay behind the vehicle 9. In particular since, in this present driving situation for the vehicle 1, the vehicle 7 is approaching too fast for the vehicle 1 to have time to overtake the vehicle 9.

However, in the exemplary situation shown in FIG. 1, the driver of the vehicle 1 anyway decides to attempt to overtake the vehicle 9 by accelerating and initiating an actual path 21 to take the path 22 past the vehicle 9. By mapping the present driving behavior with the driving model and comparing the expected near future path(s) 19a-c with the actual path 21, the vehicle control unit finds a deviation from the plurality of expected near future driving paths (19a-c), and from the driving model. Thus, in this case, the control unit provides an alert such that a driving assist system (58, FIG. 2) may intervene and steer the vehicle back to a safer path (e.g. path 19a) and slow down. It should be noted that herein is only three predicted expected near future paths shown for clarity. In accordance with the invention, there may be a vast number of predicted near future expected paths such as tens, hundreds, thousands or even more predicted expected near future paths.

Figure 2:
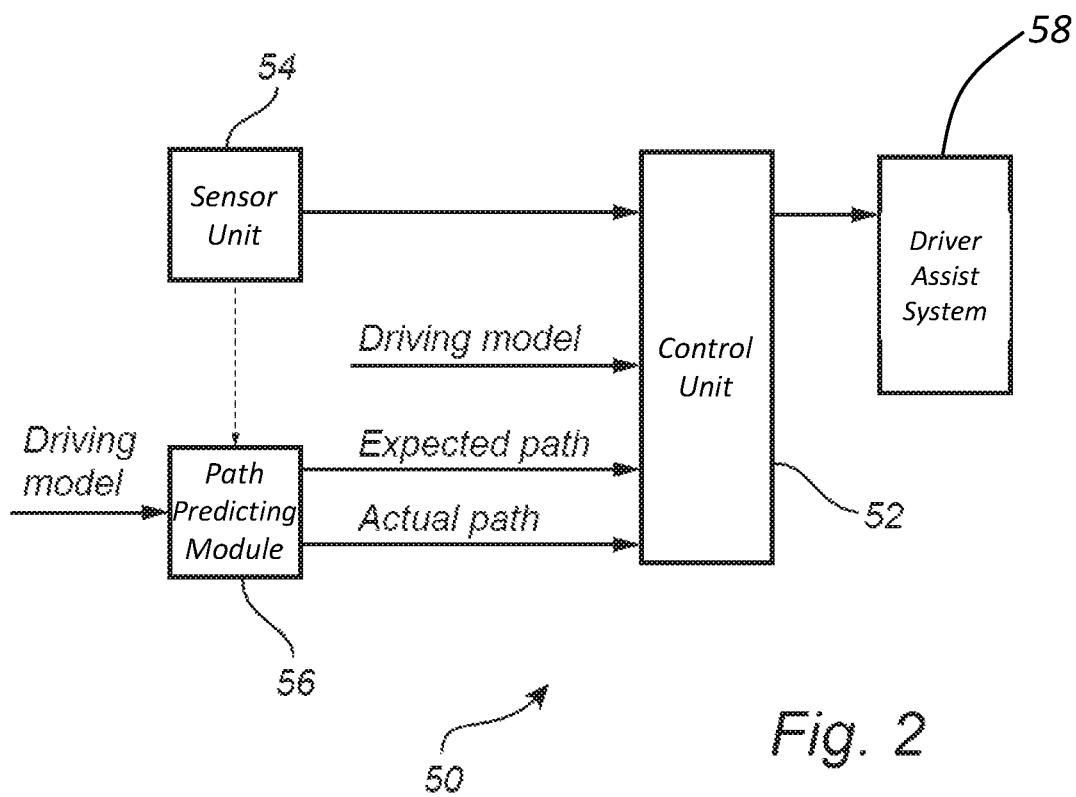
FIG. 2 schematically illustrates a block diagram of a system according to embodiments of the invention.

FIG. 2 conceptually shows a system 50 according to embodiments of the invention. The system comprises a vehicle control unit 52 configured to retrieve a driving model indicative of expected driving behavior for a present driving situation. The driving model comprises a plurality of driving related parameters for a present driving situation which can be used for assessing whether or not a present driving behavior deviates from an expected driving behavior. The driving model may be retrieved from an electronic storage device comprised in the control unit 52, or from another storage device comprised in the vehicle, or from a remote server in communication with the control unit 52.

The system further comprises a sensor unit 54 for determining present driving behavior data indicative of the present driving behavior in the present driving situation. The sensor unit 54 may comprise at least one of a an image capturing device, a radar, or a LIDAR, or vehicle sensing units for determining the speed of the vehicle, steering angle, brake force, etc. The driving behavior data is input into the control unit 52. Furthermore, the data from the sensor unit 54 may provide object data that the control unit may use to determine the present driving situation.

The system 50 further comprises a path predicting module 56 configured to predict a plurality of expected near future driving paths (19*a*-*c*) for the vehicle based on the driving model. The path predicting module 56 is further configured to determine an actual driving path for the vehicle based on present driver behavior data. The path predicting unit 56 is configured to receive sensor data from the sensor unit 54.

The control unit 52 is configured to receive the driving behavior data from the sensor unit 54 and to determine a present driving behavior based on the driving behavior data. The control unit 52 further receives the driving model and compares it with the present driving behavior.

Further, the control unit 52 receives the actual driving path and the plurality of expected near future driving paths and compares them to each other. If the control unit 52 determines that the actual driving path deviates from the plurality of expected near future driving paths, and that a deviation in the set of present driving behavior data compared to the driving model is present, the control unit 52 is configured to provide an alert signal to a driver assist system 58 configured to intervene in the driving situation to prevent a hazardous situation. The alert may be used to trigger a driver assist system to intervene the present driving action in the present driving situation.

The stochastic analysis for determining the driver model may be for example a denoising encoder, a generative adversarial network, or a markov chain method. In one preferred embodiment a generative adversarial network is used.

Figure 3:
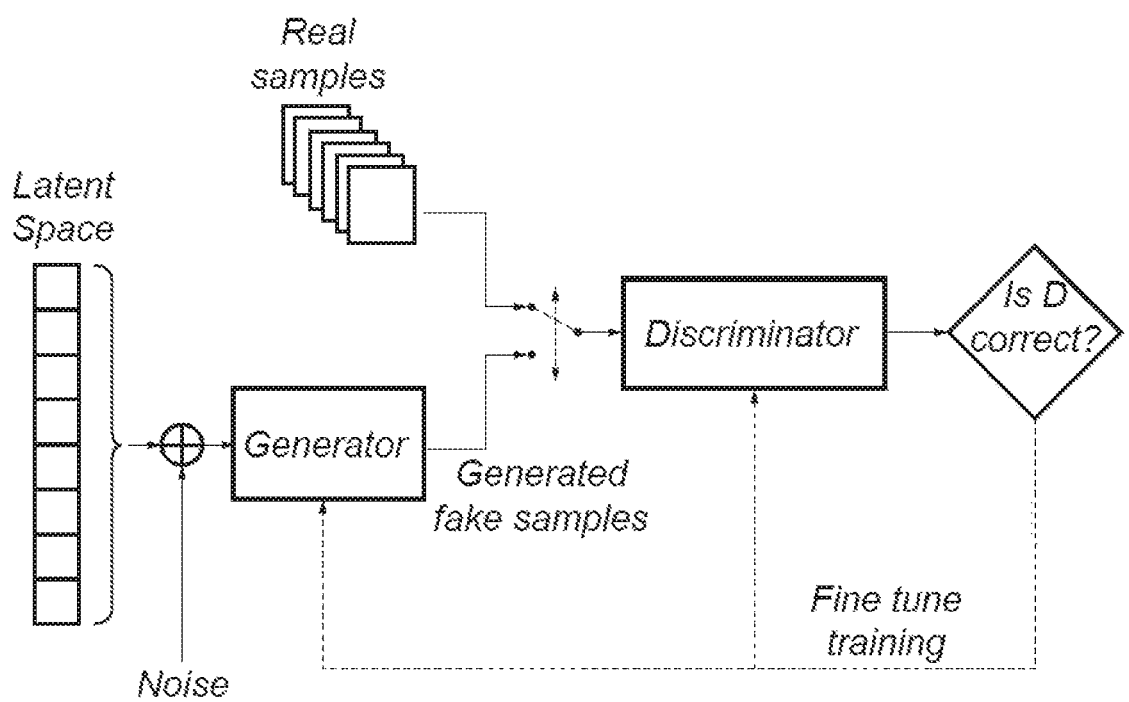
FIG. 3 conceptually illustrates a methodology for stochastically determining a driver model.

An example generative adversarial network methodology is schematically illustrated in FIG. 3. Generally, a generative adversarial network comprises a discriminator (D) and a generator (G), both may be provided in the form of a neural network.

The discriminator (D) has to undergo training, i.e. unsupervised training based on training data. It is the discriminator that will perform the mapping of driving behavior data with a driver model once it has been trained. The discriminator may be operated by the vehicle control unit 52 (see FIG. 2).

The generator (G) is configured to provide noise influenced data samples (i.e. "fake samples") from a latent space to the discriminator. The discriminator is trained to distinguish between the real samples (i.e. present driving behavior data) and the fake samples. During training it is checked whether the discriminator was correct in its determination, and the training is fine tuned based on the outcome of the discriminators decision.

The driver models may be generated offline, i.e. in (unsupervised) training sessions involving to drive vehicles in many different driving situations and collect driving behavior data which is processed by the generative adversarial network. Further, the driver models may be created from historic recorded driving behavior data, from verification or from previous vehicles with sufficient sensor setup.

Distributions of the driving behavior data may then be formed and by using for example a generative adversarial network to analyze the distributions, driving models may be generated which may predict an expected driving behavior in a given driving situation. The driving models may either be loaded onto an electronic storage device in the vehicle or it may be retrieved by the control unit 52 from a remote server (not shown).

The mapping of the present driver behavior with the driving model may comprise to compare parameters of the previously determined driver model with parameters of the present driving behavior. For example, the driver model may comprise a set of parameters for a given driving situation. The parameters may relate to steering angle for the vehicle, speed, acceleration, lane position, gear, distance to other objects, etc. Similarly, the present driver behavior data may comprise a set of parameters for a given driving situation. The parameters may relate to steering angle for the vehicle, speed, acceleration, lane position, gear, distance to other objects, etc. If the parameters are sufficiently different according to some threshold (such as number of parameters that deviate form each other, or which parameters that deviate from each other based on the present driving situation, etc), an alert signal may be provided.

In one embodiment, the present driver behavior data is added to the driver model, i.e. an online learning is applied. The present driver behavior data is thus incorporated into the driver model by applying any one of the mentioned stochastic methods.

Figure 4:
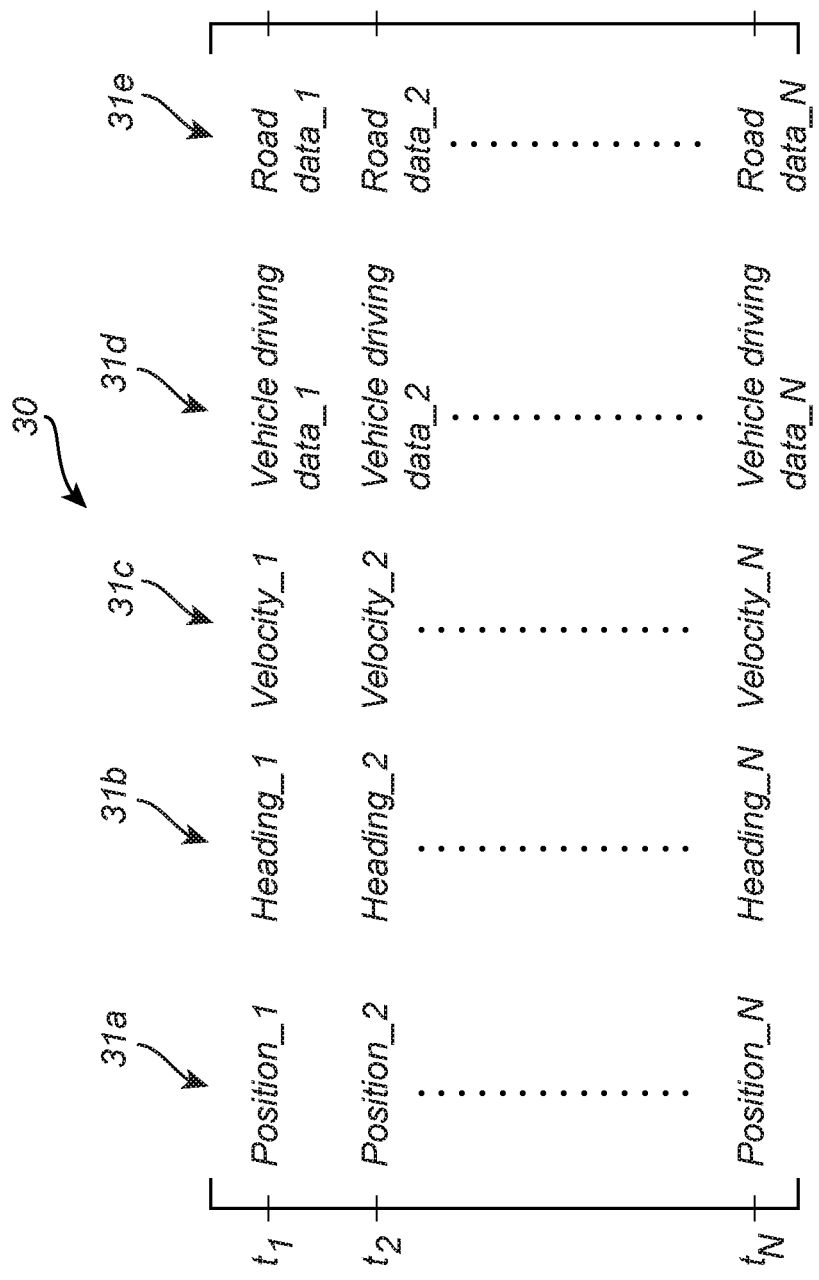
FIG. 4 conceptually shows a matrix of object data, vehicle driving data and road data.
Figure 5:
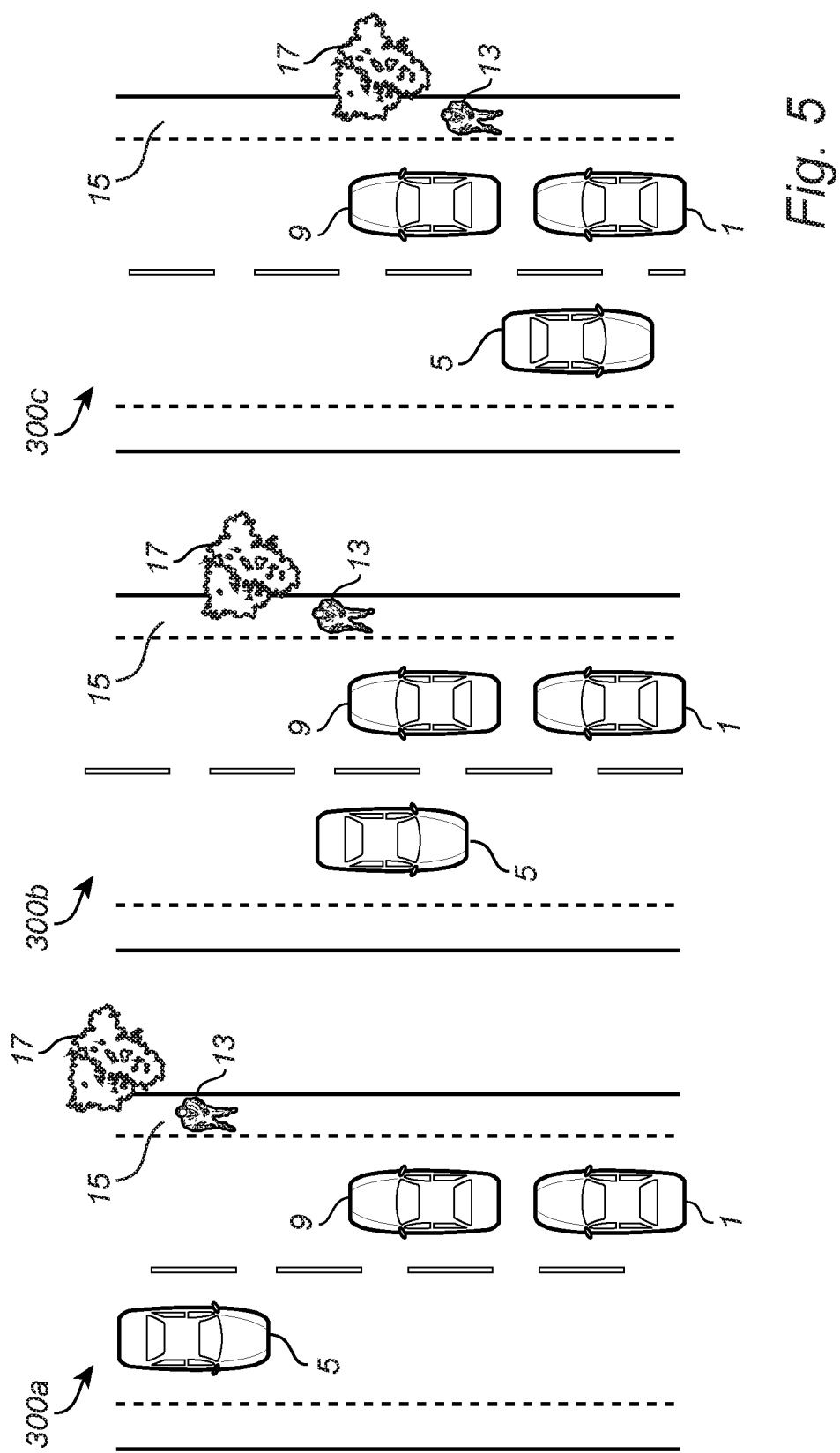
FIG. 5 conceptually shows a graphical representation of object data according to embodiments of the invention.
Figure 6:
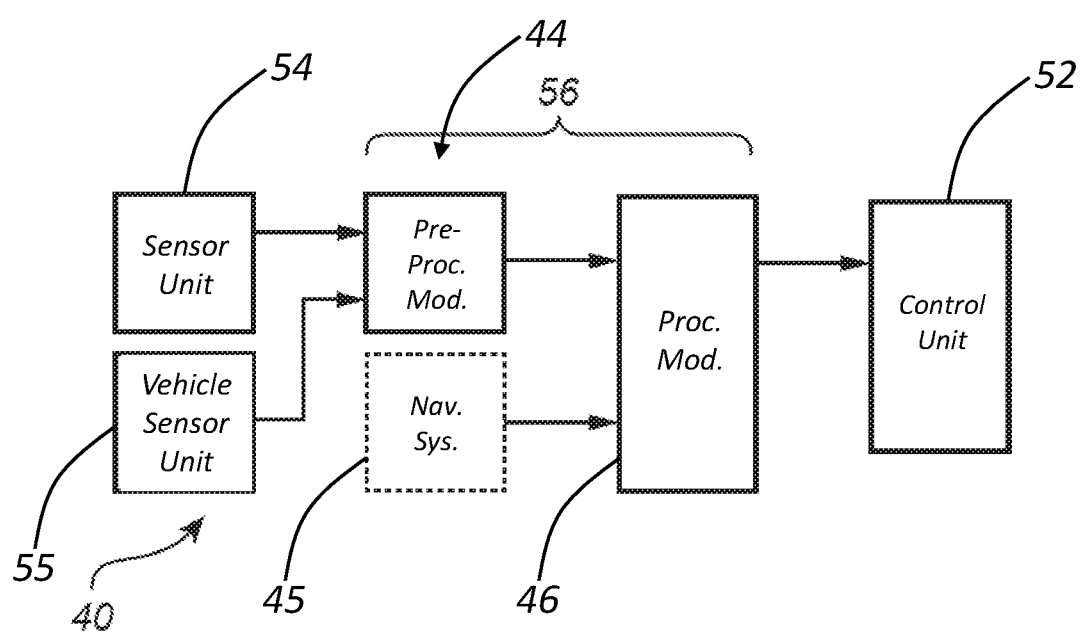
FIG. 6 schematically illustrates a system according to embodiments of the invention.

Turning now to the prediction of the expected driving paths and with reference to FIGS. 4-6.

Predicting the expected paths and the actual path may be performed in various ways. One way to predict an expected path includes acquiring sensor data from the sensor unit 54, i.e. from for example an image capturing device capturing image data, a radar, ultrasonic sensors, and/or a LIDAR. Machine neural networks or computer vision methods may be applied to the sensor data for recognizing objects in the vicinity of the vehicle and determining their statuses. Such objects may be e.g. other vehicles 7, 9, pedestrians 13, a tree 17, lane markings, etc.

Further data that may be acquired is road data such as speed limit and road curvature indicative of the roadway on the road where the vehicle is presently driving. The road information data may include the positions of road edges and lane markings with respect to the vehicle for determining the roadway. Additionally map data may be included for determining an expected near future path.

In one possible implementation, a list of object data for each of the surrounding objects 5, 9, 13, 17 is formed and comprises a time series of previous positions, previous headings, and previous velocities for each of the objects 7, 9, 13, 17 relative the vehicle 1. The time series may for example comprise positions, headings, and velocities from the previous 5 seconds with a resolution of e.g. 0.25 seconds.

A conceptual view of a matrix 30 comprising lists 31*a*-*c* of object data is shown in FIG. 4. The list 31*a* (i.e. a column in the matrix) comprises the previous positions of the object for a time series $t_1$-$t_N$. The list 31*b* comprises the previous headings of the object for the time series $t_1$-$t_N$. The list 31*c* (i.e. a column in the matrix) comprises the previous velocities of the object for the time series $t_1$-$t_N$. The list 31*d* comprises previous vehicle driving data, and the list 31e comprises previous road data. The previous positions of the objects 5, 9, 13, 17 are schematically represented by the dashed lines in FIG. 1. The matrices, one for each of the objects 5, 9, 13, 17 are input into a deep neural network for predicting the near future path for the vehicle 1. Alternatively, the data for all the objects 5, 9, 13, 17 are included in a single matrix (2D or 3D matrix). The near future path may be the immediate future 0-5 seconds.

The deep neural network may be a multi-layer convolutional neural network comprising optional recurrent or recursive layers to improve the prediction accuracy of the path prediction. The deep neural network may also improve the consistency of the path prediction.

FIG. 5 conceptually illustrates a representation of object data in the form of a graphical representation comprising a series of bird's eye views 300a-c of the vehicle 1 and the objects 7, 9, 13, 17. The bird's eye views thus together provide the time series of object positions and object velocities with respect to the vehicle 1. Also the object headings are provided by the graphical representations 300a-c. Using a graphical representation advantageously enables the use of a convolutional deep neural network to predict the path.

In the first bird's eye view representation 300a collected sensor data has been pre-processed to provide an image (i.e. matrix of data) at a first instance in time. A second bird's eye view representation 300b is provided at a second time instance in the time series and a third bird's eye view representation 300c is provided at a third time instance in the time series. Thus, the series of graphical representations provides the time series of object data and it can for example be seen how the vehicle 5 has moved from being ahead of vehicle 1 (300a) to being behind vehicle (300c). Vehicle 9 has stayed at a constant distance in front of vehicle 1, and the pedestrian and the tree has also moved in relation to the vehicle 1.

The bird's eye views 300a-c are processed by a convolutional deep learning network to predict the near future path for the vehicle 1. Note that the time series of graphical representations is here only conceptually illustrated as comprising three bird eye views 300a-c.

In an implementation, a relatively high number of bird eye views are needed and further bird eye views are continuously created and provided to the deep learning network for continuous path prediction. Using graphical representations enables improved usage of image processing techniques such as convolutional deep learning networks for predicting the near future path.

FIG. 6 conceptually illustrates a further embodiment of a system 40 in accordance with the invention. The system 40 comprises a path predicting module 56 for predicting a near future path for a vehicle. The path predicting module 56 is connected to a sensor unit 54 comprising at least one of an image capturing device, a radar, or a Lidar, for obtaining sensor data indicative of the presence of objects in the vicinity of the vehicle. The sensor data from the sensor(s) 54 also include road data indicative of the drivable road area on the road where the vehicle is presently driving. The road data may include the positions of road edges and lane markings with respect to the vehicle for determining the drivable road area.

Moreover, a vehicle sensor unit 55 is comprised in the system 40 and is configured to collect vehicle driving data indicative of at least the vehicle velocity and the vehicle yaw rate. A vehicle sensor unit 55 may comprise at least one of a gyroscope, an accelerometer, a speedometer, a steering torque sensor, etc. The vehicle sensor unit 55 provides data indicative of the acceleration, pitch rate, roll rate, etc., of the vehicle.

The sensor data, the vehicle driving data, and the road data is input to the path predicting module 56 which may comprise a pre-processing module 44 and a processing module 46. The pre-processing module 44 may comprise software components for processing the sensor data and the road data. In the pre-processing module 44, the sensor data, the vehicle driving data, and the road data is processed by e.g. computer vision methods of machine learning algorithms for obtaining object data for each of identified objects. The object data comprise previous positions, previous headings, and previous velocities for the respective object for the previous e.g. 0-5 seconds. As new sensor data, vehicle driving data, and road data is collected, updated object data is generated. The object data may be provided in the form of one or more matrices or as a graphical representation comprising a series of images each indicative of a previous position of the respective object relative the vehicle, and a previous heading of the respective object.

The matrices of object data or the graphical representations of the object data, and the road data are input into the processing module 46 of the path predicting module 56. The processing module 46 may comprise software components for executing a deep neural network for predicting the near future path for the vehicle based on the matrices of object or graphical representation of object data, the vehicle driving data, and the road data.

With further reference to FIG. 6, additional input to the deep neural network may include map information or destination data which may be input from a navigation system 45 such as one including a global position system or other means of establishing the position on the road, and input from the driver regarding the destination. The map information provides additional information for the deep neural network such as the location of crossings, exist/entrances to the highways, speed limits, number of lanes, etc.

Figure 7:
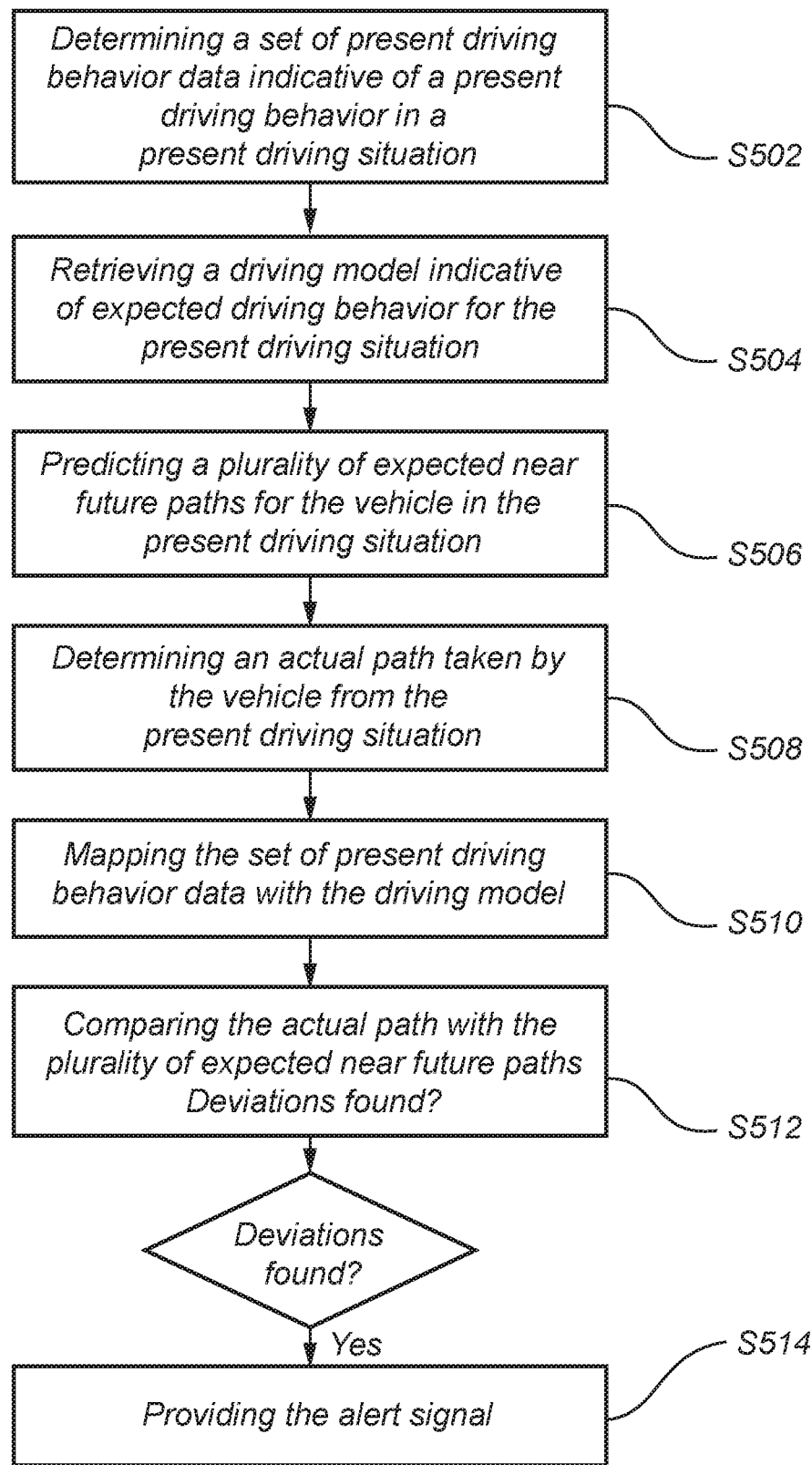
FIG. 7 is a flowchart of method steps according to embodiments of the invention.

FIG. 7 is a flow-chart of method steps according to embodiments of the invention. In a first step S502, a set of present driving behavior data indicative of a present driving behavior in a present driving situation is determined. In step S504, a driving model is retrieved and is indicative of the expected driving behavior in the present driving situation. Further, in step S508 a plurality of expected near future driving paths for the vehicle is predicted in the present driving situation. The set of present driving behavior data is mapped (step S510) with the driving model and the actual path is compared with the predicted expected driving paths (S512). When a predetermined degree of deviation in the set of present driving behavior data compared to the driving model is found, and the actual path deviates from the predicted expected paths, the alert signal is provided in step S514.

Figure 8:
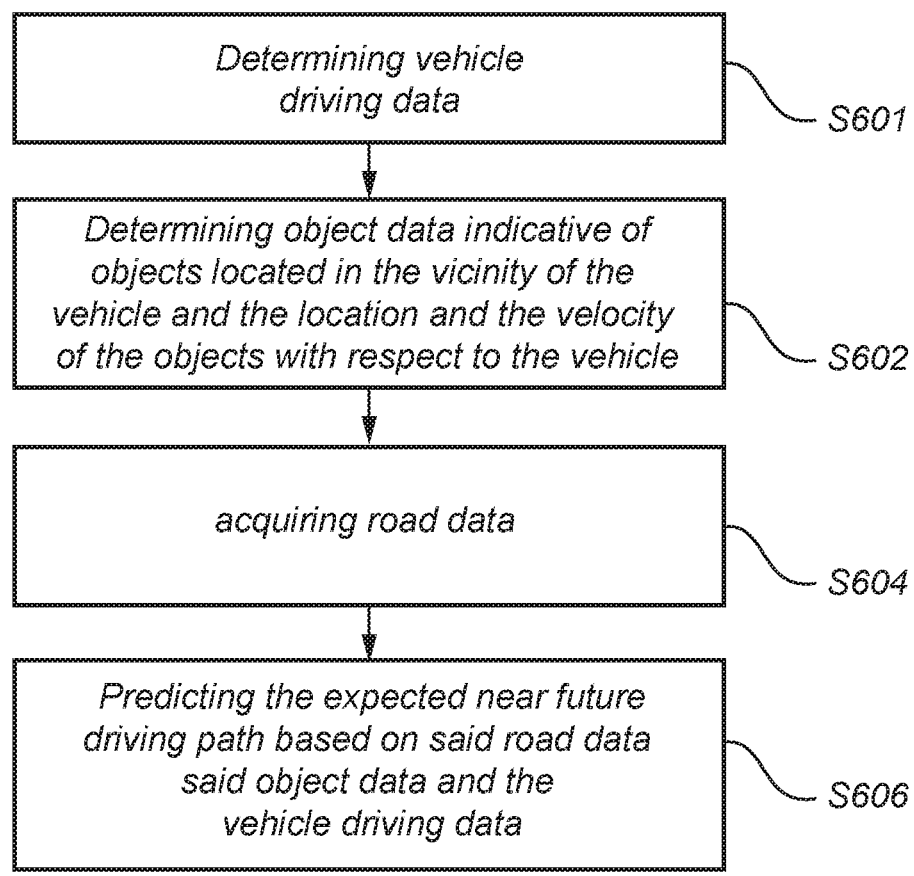
FIG. 8 is a flowchart of method steps according to embodiments of the invention.

FIG. 8 is a flow-chart of further method steps for predicting the near future path according to embodiments of the invention. Vehicle driving data indicative of at least the vehicle velocity and the vehicle yaw rate is determined in step S601. In step S602 object data is determined indicative of objects located in the vicinity of the vehicle, the heading of the objects and the velocity of the objects with respect to the vehicle. In step S604, road data comprising at least speed limit and road curvature in the present driving situation is acquired. The plurality of expected near future driving paths are predicted in step S606 based on the road data and the object data.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method for providing an alert signal to a control unit of a vehicle for controlling driver intervention, the method comprising:
   determining a set of present driving behavior data indicative of a present driving behavior in a present driving situation,
   retrieving a driving model indicative of expected driving behavior for the present driving situation, the driving model being based on historical driving behavior data collected for a plurality of driving situations, wherein the driving model is further based on stochastically analyzing distributions of the historical driving behavior data,
   predicting a plurality of expected near future paths for the vehicle in the present driving situation,
   determining an actual path taken by the vehicle from the present driving situation,
   mapping the set of present driving behavior data with the driving model, and
   comparing the actual path with the plurality of expected near future paths, and
   when a predetermined degree of deviation in the set of present driving behavior data compared to the driving model is found, and the actual path deviates from the predicted expected paths, providing the alert signal to the control unit of the vehicle.

2. The method according to claim 1, wherein the driving model is determined by processing the historical driving behavior data using any one of a denoising encoder, a generative adversarial network, or a markov chain method.

3. The method according to claim 1, wherein the expected near future driving paths are based on the present set of driver behavior data and the driving model.

4. The method according to claim 1, wherein predicting an expected near future driving path further comprises:
   determining vehicle driving data indicative of at least a vehicle velocity and a vehicle yaw rate,
   determining object data indicative of object located in a vicinity of the vehicle and a heading and a velocity of the objects with respect to the vehicle,
   acquiring road data indicative of a roadway on a road where the vehicle is presently driving, and
   predicting the expected near future driving path based on the road data, the vehicle driving data, and the object data.

5. The method according to claim 4, wherein the object data is determined from sensor data comprising at least one of image data, radar data, lidar data, or ultrasonic sensor data.

6. The method according to claim 4, wherein the road data further comprises map data.

7. The method according to claim 1, further comprising updating the driving model with the present driver behavior data.

8. The method according to claim 1, wherein the driving model is retrieved from a remote server.

9. A system for providing an alert signal for a vehicle, the system comprising:
   a control unit configured to retrieve a driving model indicative of expected driving behavior for a present driving situation, the driving model being based on historical driving behavior data collected for a plurality of driving situations, wherein the driving model is further based on stochastically analyzing distributions of the historical driving behavior data,
   a path predicting module stored in a memory and comprising coded instructions executed by a processor and configured to predict a plurality of expected near future driving paths for the vehicle and determine an actual driving path for the vehicle based on present driver behavior data, and
   a sensor unit for determining a set of present driving behavior data indicative of the present driving behavior in the present driving situation, and wherein:
   the control unit is configured to map the set of present driving behavior data with the driving model and to compare the actual driving path with the expected near future driving paths, wherein, when the actual driving path deviates from the plurality of expected near future driving paths, and when a deviation in the set of present driving behavior data compared to the model is found, the control unit is configured to provide the alert signal and control a driver intervention.

10. The system according to claim 9, wherein the expected near future driving paths for the vehicle are determined based on the present set of driver behavior data and the driving model.

11. The system according to claim 9, wherein the sensor unit comprises at least one of an image capturing device, a radar, or a lidar for acquiring sensor data indicative of objects in a vicinity of the vehicle, the system comprising a vehicle sensor unit for collecting vehicle driving data indicative of at least a velocity and a yaw rate of the vehicle, Wherein, for predicting the expected near future driving path, the path predicting module is further configured to:
determine vehicle driving data indicative of at least the vehicle velocity and the vehicle yaw rate,
pre-process the sensor data and the vehicle driving data to provide a set of object data comprising a time series of previous positions of an object relative the vehicle, a time series of the previous headings of the object, and a time series of previous velocities of the object relative to the vehicle, and
acquire road data indicative of a roadway on a road where the vehicle is presently driving, wherein the expected near future driving path is based on the road data, the vehicle driving data, and the object data.

12. The system according to claim 9, wherein the control unit is configured to provide the alert signal to a driver assist system in the vehicle.

13. Computer program product comprising a non-transitory computer readable medium having stored thereon computer program means for controlling a control unit of a vehicle to provide an alert signal, wherein the computer program product comprises:

code for determining a set of present driving behavior data indicative of a present driving behavior in a present driving situation, code for retrieving a driving model indicative of expected driving behavior for the present driving situation, the driving model being based on historical driving behavior data collected for a plurality of driving situations, wherein the driving model is further based on stochastically analyzing distributions of the historical driving behavior data, code for predicting a plurality of expected near future paths for the vehicle in the present driving situation, code for determining an actual path taken by the vehicle from the present driving situation;

code for mapping the set of present driving behavior data with the driving model, and code for, when a predetermined degree of deviation in the set of present driving behavior data compared to the model is found and the actual path deviates from the predicted expected paths, controlling the control unit to provide the alert signal.

* * * * *